United States Patent [19]

Hamamura et al.

[11] 4,357,441

[45] Nov. 2, 1982

[54] AQUEOUS EMULSION OF THERMALLY REACTIVE POLYURETHANE COMPOSITION

[75] Inventors: Tamotu Hamamura; Nobuji Inoue; Kazuo Sato, all of Kyoto, Japan

[73] Assignee: Dai-Ichi Kogyo Seiyaku Co., Ltd., Kyoto, Japan

[21] Appl. No.: 254,721

[22] Filed: Apr. 16, 1981

[30] Foreign Application Priority Data

Apr. 25, 1980 [JP] Japan ................... 55/55862

[51] Int. Cl.$^3$ .................. C08L 75/08; C08L 75/12
[52] U.S. Cl. .................... 524/591; 524/500; 524/501; 524/503; 524/507; 525/453; 525/458
[58] Field of Search ............... 260/29.2 TN; 252/355; 525/453, 458; 524/500, 591

[56] References Cited

U.S. PATENT DOCUMENTS 3,898,197  8/1975  Guise et al. ............... 260/29.2 TN
3,989,458  11/1976  Guise ........................ 525/453
4,039,517  8/1977  Hamamura et al. ....... 260/29.2 TN
4,124,553  11/1978  Guise ....................... 260/29.2 TN Primary Examiner—Theodore E. Pertilla
Attorney, Agent, or Firm—Millen & White

[57] ABSTRACT

An aqueous emulsion of a thermally reactive polyurethane composition comprising a blocked polyisocyanate component having at least two masked isocyanate groups in the molecule uniformly dispersed in an aqueous medium, and a reactive anionic surface active agent of the formula:

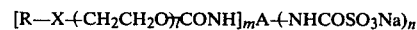

wherein R is a $C_7$-$C_{26}$ alkyl, alkaryl or alkenyl group; X is —O—, —COO—, —S— or —NR'— wherein R' is a polyoxyalkylene group or a $C_1$-$C_{22}$ alkyl group; l is 0 or an integer from 1 to 200; m and n each represents an integer from 1 to 4, the sum of m+n being not greater than 5; and A is the residue of a polyisocyanate compound with the removal of isocyanate groups.

12 Claims, No Drawings

AQUEOUS EMULSION OF THERMALLY REACTIVE POLYURETHANE COMPOSITION

BACKGROUND OF THE INVENTION

This invention relates to a novel aqueous emulsion comprising thermally reactive polyurethane compositions.

Thermally reactive polyurethane compositions comprise a blocked polyisocyanate component having at least two masked isocyanate groups in the molecule. The blocked polyisocyanate component is normally inert but can regenerate reactive free isocyanate groups upon heating by the thermal dissociation thereof.

Aqueous emulsions of thermally reactive polyurethane compositions have many advantages and may find a variety of important uses. These emulsions have been conventionally prepared by dispersing, self-emulsifying, thermally reactive polyurethane compositions in water, or compulsorily emulsifying thermally reactive, hydrophobic polyurethane compositions with the aid of surface active agents.

Self-emulsifying polyurethane compositions may be prepared by introducing anionic, cationic or amphoteric electrolytic groups, or nonionic hydrophilic groups such as polyoxyethylene chains in the molecule. The introduction of electrolytic groups exhibits certain disadvantages. The starting polyurethane composition should not have too high molecular weights. The resulting film tends to become tacky and hygroscopic upon aging and thus becomes less water-resistant. The introduction of a large amount of oxyethylene groups adversely affects the properties of the resultant resin such as crystallinity, water-resistance and the like. If the density of urethane linkage in the molecule is too high, the resulting composition becomes less hydrophilic.

The compulsory emulsifying method requires relatively large amounts of surface active agent ranging from 3% to 20% based on the weight of polymer depending upon the molecular weight and hydrophobic property of the polyurethane composition. The presence of a large amount of surface active agent also adversely affects the properties of the resulting resin.

It is therefore, a main object of this invention to provide a novel aqueous emulsion of thermally reactive polyurethane compositions which are free of the above-mentioned disadvantages.

Other objects and advantages will become apparent as the description proceeds.

SUMMARY OF THE INVENTION

According to the present invention, there is provided an aqueous emulsion of a thermally reactive polyurethane composition comprising a blocked polyisocyanate component having at least two masked isocyanate groups in the molecule uniformly dispersed in an aqueous medium, and a reactive anionic surface active agent of the formula:

wherein R is a $C_7$–$C_{26}$ alkyl, alkaryl or alkenyl group; X is —O—, —COO—, —S— or —NR'— wherein R' is a polyoxyalkylene group or a $C_1$–$C_{22}$ alkyl group; l is 0 or an integer from 1 to 200; m and n each represents an integer from 1 to 4, the sum of n+m being not greater than 5; and A is the residue of a polyisocyanate compound with removal of the isocyanate groups.

DETAILED DISCUSSION

The present invention employs as an emulsifier the above-described reactive anionic surface active agent. This surface active agent also has at least one blocked isocyanate group in the molecule and is capable of regenerating a reactive free isocyanate group upon heating at a temperature above 60° C. Thus, the emulsifier may be finally incorporated in the finished polyurethane structure by cross-linking with the dispersed polyisocyanate component or other active hydrogen compounds present in the emulsion. This does not leave any exogenic emulsifier in the finished resin. Since the starting polyurethane component may be composed of hydrophobic types and the emulsifier may be incorporated in the polyurethane structure, the resulting resin does not contain any electrolytic group or a large amount of hydrophilic oxyethylene group. It is for this reason that the polyurethane resin formed from the aqueous emulsion of this invention exhibits more advantageous properties than those formed from prior art emulsions, particularly in water-resistant property.

The aqueous emulsion of the present invention comprises, as a disperse phase, a blocked polyisocyanate component having at least two masked isocyanate groups. The blocked polyisocyanate component may be prepared using any known method by reacting a masking agent with a compound having at least two free isocyanate groups. Examples of the starting isocyanate compound include aliphatic, cycloaliphatic or aromatic diisocyanates such as 2,6-tolylenediisocyanate and its position isomers, 4,4'-diphenylmethanediisocyanate, xylylenediisocyanate, isophoronediisocyanate, 1,6-hexamethylenediisocyanate and the like; adducts of said diisocyanate with a low molecular weight polyhydric alcohol such as trimethylolpropane; trimers of tolylenediisocyanate and/or 1,6-hexamethylenediisocyanate having an isocyanurate ring; tris-(isocyanatohexyl)-biuret; methylene-bridged polyphenylpolyisocyanate and the like.

Urethane prepolymers having at least two free isocyanate groups may also be employed as the starting material. The urethane prepolymers are prepared, as well-known, by reacting a polyisocyanate compound of the above-mentioned type with a polymeric polyhydroxyl compound having a molecular weight from 200 to 10,000, such as polyether/polyols, polyester/polyols, polyether/polyester/polyols and polybutadiene glycols. Examples of polyether/polyols include homopolymers, random or block copolymers of alkylene oxides such as ethylene oxide and propylene oxide.

Polyester/polyols and polyether/polyester/polyols may be prepared, as well-known in the art, by reacting a polybasic carboxylic acid such as succinic acid, adipic acid, phthalic acid and maleic anhydride with a polyhydric alcohol such as ethylene glycol, diethylene glycol, 1,4-butanediol, neopentyl glycol, 1,6-hexanediol, and trimethylolpropane, or a low molecular weight polyalkylene glycol such as polyethylene glycol and polypropylene glycol. Polyether/polyester/polyols may also be produced by reacting ethylene oxide and/or propylene oxide with a polyester/polyol.

The urethane prepolymers may be chain-extending using known chain-extenders such as ethylene glycol, diethylene glycol, 1,4-butanediol, trimethylolpropane, pentaerythritol, ethylenediamine, hexamethylenediamine, monoethanolamine, diethanolamine and the like.

The synthesis of urethane prepolymers may be carried out by reacting the reaction components in one step or stepwise at a temperature below 150° C., preferably from 60° C. to 120° C. for a sufficient length of time. The molar ratio of NCO/OH of the starting reaction components should be greater than 1.0.

The reaction may be carried out under the current of an inert gas such as nitrogen gas and/or in the presence of a catalyst. Examples of catalysts include tertiary amines such as triethylamine and diazabicyclooctane, and organometallic compounds such as dibutyltin dilaurate.

The resulting prepolymers may be diluted with an inert solvent to adjust the viscosity at a suitable level. The solvent may be added during or after the reaction. Examples of usable solvents include acetone, methyl ethyl ketone, tetrahydrofuran, dioxane, N,N-dimethylformamide, ethyl acetate, toluene and the like.

The free isocyanate groups present in the polyisocyanate compounds and the urethane prepolymers are then blocked or masked by a blocking agent. Any known blocking agent may be used. Examples of suitable blocking agents include secondary or tertiary alcohols such as isopropanol and tert-butanol; active methylene compounds such as dialkyl malonate, acetylacetone and alkyl acetoacetate; oximes such as acetoxime, methyl ethyl ketoxime and cyclohexanone oxime; lactams such as $\epsilon$-caprolactam; phenols such as phenol, chlorophenol, cresol, p-tert.-butylphenol, p-sec.-butylphenol, p-sec.-amylphenol, p-octylphenol and p-nonylphenol; heterocyclic hydroxy compounds such as 3-hydroxypyridine, 8-hydroxyquinoline, 8-hydroxyquinaldine and the like.

These blocking agents may be reacted with the free isocyanate group-containing compounds at a temperature from room temperature to 100° C., preferably from 50° C. to 90° C. and, if necessary in the presence of an inert solvent and a catalyst. Examples of catalysts include alkali metal alkoxide such as sodium methoxide, tertiary amines such as triethylamine and organometallic compounds such as dibutyltin dilaurate. When secondary or tertiary alcohols are employed as the blocking agent, basic catalysts such as sodium methoxide and triethylamine are preferable. The amount of catalyst preferably lies between 0.05% and 0.5% by weight based on the weight of starting isocyanate compound or prepolymer.

The amount of blocking agent is preferably stoichiometric amount or slightly greater than this amount.

The reactive anionic surface active agent used for emulsifying the blocked isocyanate component in accordance with the present invention may be prepared by reacting a compound of the formula:

R—X—(CH$_2$CH$_2$O)$_l$H wherein R, X and l are as defined above, with a polyisocyanate compound of the formula:

A—(NCO)$_{m+n}$ wherein A, m and n are as defined above, and then reacting the resultant reaction product with sodium bisulfite. Examples of compounds of the formula:

R—X—(CH$_2$CH$_2$O)$_l$H include polyethylene glycol mono-higher alkyl ethers such as the monolauryl or monostearyl ether, polyethylene glycol mono-higher fatty acid ester, polyethylene glycol mono-alkylaryl ether such as the mono-nonylphenyl ether, polyethylene glycol mono-higher alkyl thioether such as the mono-dodecyl thioether, ethylene oxide adducts of higher fatty amines, higher fatty alcohols, higher fatty acid, higher alkylmercaptans, higher fatty amines and alkylphenols. The recurring unit for the oxyethylene group l may be from 1 to 200, preferably 5 to 100.

Aliphatic, cycloaliphatic and aromatic polyisocyanate compounds may be employed.

Preferable examples thereof include hexamethylenediisocyanate, xylylenediisocyanate, isophoronediisocyanate and tris-(isocyanatohexyl)-biuret.

The molar ratio of the compound R—X—(CH$_2$CH$_2$O)$_l$H to the polyisocyanate compound A—(NCO)$_{m+n}$ is such that at least one free isocyanate group remains unreacted in the reaction product.

Then the resultant reaction product having at least one free isocyanate group is reacted with an aqueous solution of sodium bisulfite by the known method.

The resultant reaction mixture usually takes the form of an aqueous solution and may be used as such for emulsifying the aforementioned blocked polyisocyanate component. The blocked polyisocyanate component and the reactive anionic surfactant are vigorously stirred at a temperature below 60° C. while adding a suitable amount of water. Alternatively, the surfactant may be added to water or the polyisocyanate component and then mixed with the remaining component with stirring.

The amount of reactive anionic surfactant varies with the nature of the particular blocked polyisocyanate component, the nature and quantity of solvent present in the disperse phase, and generally ranges from 3% to 50% by weight based on the weight of the blocked polyisocyanate component.

Since the reactive anionic surfactants used in the present invention are eventually chemically bound with the resulting polyurethane structure, they may be used in an amount sufficient to stabilize the emulsion for a long period of time. The stability and the shelf-life of an emulsion are generally affected by the presence of an organic solvent and the storage temperature. The emulsions of this invention can withstand long-time storage at normal temperature. If necessary, the organic solvent present in the emulsion may be selectively removed by suitable means such as evaporation under reduced pressure.

The blocked isocyanate groups present in the disperse phase and the emulsifier may regenerate free isocyanate groups at an elevated temperature. The regenerated free isocyanate group will then react with an active hydrogen atom to form a urethane linkage or the like as well-known in the art. The active hydrogen compound may be conventional chain-extenders such as polyhydric alcohols, polyamines and water. The aqueous emulsion of this invention may be used for cross-linking active hydrogen-containing polymeric material.

The aqueous emulsion of this invention, therefore, may find uses as coating compositions, adhesive compositions, cross-linking agents and the like. Various textile products may be treated with the emulsion of this invention for the purposes of water-proofing treatment, anti-crease treatment, touch-improving treatment and the like. Other important uses are, for example, adhesion of polyester textile; cross-linking and modifying cotton, polyvinyl alcohol or nylon fibers; impregnation of non-woven fabrics; adhesion of wood, rubber, leather or plastic products. Aqueous dispersions of homopolymers and copolymers of vinyl acetate, acrylate, vinyl chloride and styrene; natural and synthetic rubber latex; and aqueous dispersions of water-soluble alkyl resins and aminoplast resins may also be modified with the emulsion of this invention for improving their properties. To further illustrate the invention, the following examples are presented. Unless otherwise indicated all parts and percentages are by weight.

PREPARATION OF REACTIVE SURFACE ACTIVE AGENT

EXAMPLE 1

110 parts of an adduct of one mole of nonylphenol and 5 moles of ethylene oxide (average MW=440) were reacted with 42 parts of 1,6-hexamethylenediisocyanate at 85°–90° C. for one hour to produce a urethane prepolymer having a free isocyanate content of 6.85%(6.91% in theory). This prepolymer was cooled to 50° C., diluted with 30 parts of dioxane to adjust the viscosity and then reacted with 74 parts of 35% aqueous solution of sodium bisulfite with stirring. The reaction mixture became homogeneous within about 5 minutes and gave a transparent, viscous liquid by continuing the reaction for 15 minutes. This liquid was diluted with 100 parts of water to a solid content of about 50% and used as an emulsifier in Example 6.

EXAMPLE 2

742 parts of an adduct of one mole of stearyl alcohol and 10 moles of ethylene oxide (average MW=710) were reacted with 37.6 parts of xylylenediisocyanate at 85°–90° C. for 90 minutes to produce a urethane prepolymer having a free isocyanate content of 4.56%(4.68% in theory). This prepolymer was cooled at 50° C., diluted with 36 parts of dioxane and then reacted with 60 parts of 35% aqueous solution of sodium bisulfite for 30 minutes with stirring. The reaction mixture was diluted with 226 parts of water to a solid content of about 40% and used as emulsifier in Example 7.

EXAMPLE 3

102 parts of an adduct of one mole of oleic acid and 40 moles of ethylene oxide (average MW=2,040) were reacted with 9.9 parts of xylylenediisocyanate at 85°–90° C. for 50 minutes to produce a urethane prepolymer having a free isocyanate content of 2.02%(1.88% in theory). This prepolymer was cooled to 50° C., diluted with 22 parts of dioxane and then reacted with 16 parts of 35% aqueous solution of sodium bisulfite for 30 minutes with stirring. The reaction mixture was diluted with 186 parts of water to a solid content of about 35% and used in Example 8.

EXAMPLE 4

100 parts of an adduct of one mole of distearylamine and 70 moles of ethylene oxide (average MW=3,600) were reacted with 14.9 parts of tris-(isocyanatohexyl)-biuret(isocyanate content=23.5%) at 85°–90° C. for 60 minutes to obtain a urethane prepolymer having free isocyanate content of 1.99%(2.03% in theory). This prepolymer was cooled to 50° C., diluted with 30 parts of dioxane and then reacted with 16.2 parts of 35% aqueous solution of sodium bisulfite with stirring. The reaction mixture was diluted with 240 parts of water to a solid content of about 30% and used in Example 9.

EXAMPLE 5

100 parts of an adduct of one mole of dodecyl mercaptan and 100 moles of ethylene oxide (average MW=4,600) were reacted with 11.7 parts of tris-(isocyanatohexyl)-biuret(isocyanate content=23.5%) at 85°–90° C. for 60 minutes to obtain a urethane prepolymer having a free isocyanate content of 1.66%(1.64% in theory). This prepolymer was cooled to 50° C., diluted with 35 parts of dioxane and then reacted with 13.1 parts of 35% aqueous solution of sodium bisulfite for 30 minutes with stirring. The reaction mixture was diluted with 228 parts of water to a solid content of about 30% and used in Example 10.

Preparation of Thermally Reactive Polyurethane Emulsion

EXAMPLE 6

A flask provided with a reflux condenser, a thermometer, a tap funnel and a stirrer was charged with 100 parts of tris-(isocyanatohexyl)-biuret(isocyanate content=23.5%) and 20 parts of dioxane. To the mixture were added 49 parts of methyl ethyl ketoxime dropwise at 50° C. requiring for 10 minutes. Thereafter the mixture was stirred for 1 hour at 85°–95° C. and cooled to room temperature.

169 parts of a solution of blocked isocyanate compound having a free isocyanate content of 0.04% were obtained.

This solution was mixed with 30 parts of an aqueous solution containing about 50% of the reactive surface active agent prepared in Example 1. To the resultant mixture were gradually added 211 parts of water at 30° C. with stirring to give an aqueous emulsion having a solid content of 40%.

20 g of this emulsion was mixed with 1.22 g of trimethylolpropane(stoichiometric amount in terms of OH/-blocked NCO) dissolved in 10 g of water.

A small amount of the mixture was cast into a TEFLON coated petri dish. The resultant film was dried at 70° C. for 2 hours and cured at 160° C. for 10 minutes to give a transparent, tack-free, rigid film. The film was soaked in water at room temperature for 24 hours, or in boiling water for 2 hours. The film was not whitened or swollen and no change was seen in its appearance in these tests.

COMPARATIVE EXAMPLE 1

169 parts of the solution of blocked isocyanate compound prepared in Example 6 were mixed with 15 parts of an adduct of one mole of nonylphenol and 20 moles of ethylene oxide. To the resultant mixture were gradually added 226 parts of water at 30° C. with stirring to give an aqueous emulsion having a solid content of about 40%.

A film was prepared from this emulsion and tested on its water-resistance as in Example 6. The film was remarkably whitened and swollen, and became brittle after soaking in water at room temperature for 24 hours. When soaking in boiling water, whitening and swelling of the film began to take place after the lapse of 30 minutes. The film became opaque and brittle after soaking for 2 hours.

When a comparison is made between Example 6 and Comparative Example 1, it will be apparent that the film prepared from the aqueous emulsion of the present invention has an excellent water-resistant property.

EXAMPLE 7

27 parts of hexamethylenediisocyanate, 100 parts of a polyester/diol prepared from adipic acid/1,6-hexanediol/neopentyl glycol at a molar ratio of 2:1:5(hydroxyl number=90, acid number=2.5) and 17 parts of polyethylene glycol(average MW=1,000) were reacted in a flask at 95° C. for 1 hour to give a urethane prepolymer having a free isocyanate content of 3.46%(3.73% in theory).

This prepolymer was cooled to 50° C. and diluted with 14 parts of dioxane for adjusting the viscosity at a suitable level. To the mixture were added 17.8 parts of p-sec.-butylphenol and 0.1 parts of triethylamine both dissolved in 15 parts of dioxane. The mixture was first allowed to react exothermically and then at 85°–90° C. for 1 hour. 190.9 parts of a solution of blocked urethane prepolymer having a free isocyanate content of 0.06% were obtained.

This solution was mixed with 40.5 parts of an aqueous solution containing about 40% of the reactive surface active agent prepared in Example 2. To the resultant mixture were added gradually 480.6 parts of water at 30° C. with stirring to give an aqueous emulsion having a solid content of about 25%.

100 g of this emulsion was mixed with 0.76 g of trimethylolpropane(stoichiometric amount in terms of OH/blocked NCO) dissolved in 10 parts of water.

A film was prepared from this mixture as in Example 6. The resultant film was transparent, tack-free and flexible and exhibited the following properties.

| Tensile strength, | 130kg/cm$^2$ |
| 100% Modulus, | 8kg/cm$^2$ |
| Elongation, | 1300% |
| Swelling in water, | 10% |

Swelling in water was determined by soaking the test piece in water at room temperature for 24 hours and calculated according to the following equation:

$$\text{Swelling rate (\%)} = \frac{Ax - Ao}{Ao} \times 100$$

wherein Ao is the area of film(cm$^2$) before soaking, and Ax is the area of film after soaking.

COMPARATIVE EXAMPLE 2

190.9 parts of the solution of blocked urethane prepolymer prepared in Example 7 were mixed with 12 parts (7.4% based on the blocked prepolymer) of an adduct of one mole of stearyl alcohol and 20 moles of ethylene oxide. To the resultant mixture were gradually added 492.3 parts of water at 30° C. with stirring to give an aqueous emulsion having a solid content of about 25%.

A film was prepared from this emulsion and tested on its properties as in Example 7. The results are as follows:

| Tensile strength, | 95kg/cm$^2$ |
| 100% Modulus | 6kg/cm$^2$ |
| Elongation | 1400% |
| Swelling in water | 25% |

When a comparison is made between Example 7 and comparative Example 2, it will be apparent that the film prepared from the aqueous emulsion of the present invention has excellent water-resistant and strength properties.

EXAMPLE 8

16.8 parts of hexamethylenediisocyanate and 100 parts of a polyester/diol prepared from adipic acid/diethyleneglycol (hydroxyl number=56.1, acid number=0.8) were reacted in a flask at 95° C. for 80 minutes to give a urethane prepolymer having a free isocyanate content of 3.52%(3.60% in theory).

This prepolymer was cooled to 50° C. and then reacted with 11 parts of ε-caprolactam dissolved in 35 parts of dioxane in the presence of 0.1 parts of triethylamine at 85°–90° C. for 90 minutes. 162.9 parts of a solution of blocked urethane prepolymer having a free isocyanate content of 0.08% were obtained.

This solution was mixed with 43.8 parts (12% based on the weight of blocked prepolymer) of an aqueous solution containing about 35% of the reactive surface active agent prepared in Example 3. To the resultant mixture were gradually added 270.8 parts of water at 30° C. with stirring to give an aqueous emulsion having a solid content of about 30%.

100 g of this emulsion was mixed with 0.93 g of trimethylolpropane(stoichiometric amount in terms of OH/blocked NCO) dissolved in 10 g of water and 5 g of 5% emulsion of dibutyltin dilaurate. A film was prepared from this mixture as in Example 6. The resultant film was transparent, resilient and tough, and has the following properties:

| Tensile strength, | 340kg/cm$^2$ |
| 100% Modulus, | 23kg/cm$^2$ |
| Elongation | 550% |
| Swelling in water | 5% |

COMPARATIVE EXAMPLE 3

162.9 parts of the solution of blocked urethane prepolymer prepared in Example 8 were mixed with 12.8 parts (10% based on the weight of blocked prepolymer) of an adduct of one moles of stearyl alcohol and 15 moles of ethylene oxide. To the resultant mixture were gradually added 293 parts of water at 40° C. with stirring to give an aqueous emulsion having a solid content of about 30%.

A film was prepared from this emulsion and tested on its properties as in Example 8. The results are as follows:

| Tensile strength, | 245kg/cm$^2$ |
| 100% Modulus, | 16kg/cm$^2$ |
| Elongation | 700% |
| Swelling in water, | 15% |

COMPARATIVE EXAMPLE 4

To the urethane prepolymer having a free isocyanate content of 3.52% prepared in Example 8 were added 8.2 parts of ε-caprolactam and 0.1 parts of triethylamine both dissolved in 35 parts of dioxane at 40° C. with stirring. The mixture was reacted at 85°–90° C. for 90 minutes and then cooled to room temperature to give 160.1 parts of a solution of blocked urethane prepolymer having a free isocyanate content of 0.85%. To this solution were added 8.7 parts of 40% aqueous solution of sodium taurinate(stoichiometric amount relative to the free isocyanate content) and the mixture was reacted at 35°–50° C. for minutes. 259.5 parts of water were gradually added to the mixture with stirring to give 428.3 parts of a soap-free aqueous dispersion having a solid content of 30%.

To 100 g of this dispersion were added 0.77 g of trimethylolpropane(stoichiometric amount in terms of OH/blocked NCO) in 10 g of water and 5 g of 5% aqueous emulsion of dibutyltin dilaurate. A film was prepared from this mixture and tested as in Example 6. The results are as follows:

| Tensile strength, | 270kg/cm$^2$ |
| 100 Modulus, | 17kg/cm$^2$ |
| Elongation, | 600% |
| Swelling in water, | 12% |

When a comparison is made between Example 8 and Control Example 3 or 4, it will be apparent that the film prepared from the aqueous emulsion of this invention has excellent water-resistant and strength properties.

EXAMPLE 9

100 parts of methylene-bridged polyphenylpolyisocyanate having a free isocyanate content of 29% were reacted with 42 parts of polyethylene glycol(average MW=600) in a flask at 85°–90° C. for 1 hour to give a urethane prepolymer having a free isocyanate content of 16.24%(16.49% in theory). The resultant prepolymer was cooled to 50° C. and reacted with 80 parts of 8-hydroxyquinoline dissolved in 43 parts of dioxane at 85°–90° C. for 30 minutes to give 265 parts of a solution of blocked urethane prepolymer.

This solution was mixed with 117.7 parts(15% based on the weight of blocked prepolymer) of the aqueous solution of reactive surface active agent prepared in Example 4. To the mixture were gradually added 685 parts of water with stirring and dioxane was distilled off in vacuo from the mixture. An aqueous emulsion having a solid content of about 25% was obtained.

COMPARATIVE EXAMPLE 5

265 parts of the solution of blocked urethane prepolymer prepared in Example 9 and 8.9 parts of sodium dodecylbenzenesulfonate were thoroughly mixed. To the mixture were gradually added 700 parts of water at 40° C. with stirring. Dioxane was distilled off in vacuo and an aqueous emulsion having a solid content of about 25% was obtained.

EXAMPLE 10

100 parts of methylene-bridged polyphenylpolyisocyanate having a free isocyanate content of 29% were reacted with 75 parts of polyethylene glycol having an average molecular weight of 1,000 in a flask at 85°–90° C. for 1 hour to give a urethane prepolymer having a free isocyanate content of 12.98% (13.14% in theory). The resulting prepolymer was cooled to 50° C. and reacted with 111 parts of p-octylphenol dissolved in 88 parts of dioxane in the presence of 0.2 parts of triethylamine at 85°–90° C. for 1 hour to give 374.2 parts of a solution of blocked urethane prepolymer having a free isocyanate content of 0.11%.

This solution was mixed with 76 parts(8% based on the weight of blocked prepolymer) of the aqueous solution of reactive surface active agent prepared in Example 5. To the mixture were gradually added 917 parts of water with stirring and dioxane was distilled off in vacuo. An aqueous emulsion having a solid content of about 25% was obtained.

CONTROL EXAMPLE 6

374.2 parts of the solution of blocked urethane prepolymer prepared in Example 10 and 20 parts of an adduct of one mole of nonylphenol and 20 moles of ethylene oxide(7% based on the weight of blocked prepolymer) were thoroughly mixed. To the mixture were added 930 parts of water at 40° C. with stirring and dioxane was distilled off in vacuo. An aqueous emulsion having a solid content of about 25% was obtained.

Cross-Linking of Polyvinyl Alcohol

The thermally reactive polyurethane emulsion of this invention may be used for cross-linking and modifying various resins and fibers having reactive groups such as hydroxyl and amino groups.

As a representative, polyvinyl alcohol(PVA) was cross-linked with the aqueous emulsions prepared in the preceding Examples and Comparative Examples. A mixture containing 20% aqueous solution of PVA, a thermally reactive polyurethane emulsion and dibutyltin dilaurate(catalyst) as shown in the following Table was cast into a TEFLON coated petri dish, dried at 70° C. for 60 minutes and cured at 160° C. for 10 minutes to give a film of 0.5 mm thickness. The resulting film was tested on the water-resistant, solvent-resistant and strength properties. The results are as follows:

| Run No. | 1 | 2 | 3 | 4 | 5 | 6 | 7 |
|---|---|---|---|---|---|---|---|
| 20% PVA, parts | 100 | 100 | 100 | 100 | 100 | 100 | 100 |
| Emulsion, parts | — | Ex. 6 5 | Com. 1 2 | Ex. 9 3 | Com. 5 3 | Ex. 10 3 | Com. 6 3 |
| Catalyst, parts | — | 0.25 | 0.25 | 0.15 | 0.15 | 0.15 | 0.15 |
| Water-*$^1$ resistance | 100 | 2.3 | 5.7 | 3.1 | 6.3 | 3.5 | 6.7 |
| Solvent-*$^2$ resistance | 0.8 | 1.0 | 1.3 | 1.1 | 1.3 | 1.3 | 1.2 |
| Tensile strength, kg/cm$^2$ | 789 | 804 | 715 | 794 | 714 | 770 | 695 |

*$^1$Percent decrease in weight after soaking in boiling water for 30 minutes.
*$^2$Percent decrease in weight after soaking in perchlorethylene at room temperature.

The above test results show that the aqueous emulsions of this invention (Examples 6, 9 and 10) are more excellent than the prior art emulsions (Comparative Examples 1, 5 and 6) in cross-linking and modifying polyvinyl alcohol.

The above has been offered for illustrative purposes only, and it is not for the purpose of limiting the scope of this invention which is defined in the claims below.

We claim:

1. In an aqueous emulsion of a thermally reactive polyurethane-forming composition, comprising (a) a uniformly dispersed hydrophobic, blocked polyisocyanate having a plurality of masked isocyanate groups, said groups being only non-electrolytic masked isocyanate groups capable of regenerating free isocyanate groups at an elevated temperature, and (b) a dispersing effective amount of a surfactant, the improvement wherein said surfactant is a thermally reactive anionic surfactant of the formula [R—X—(CH$_2$CH$_2$O)$_l$CONH—]$_m$A—(NHCOSO$_3$Na)$_n$ wherein R is a C$_{7-26}$ alkyl, alkaryl or alkenyl group; X is —O—, —COO—, —S— or —NR'— wherein R' is a polyoxyethylene group or a C$_{1-22}$ alkyl group; l is 0 or an integer from 1 to 200; m and n are each an integer from 1 to 4, the sum of m+n being not greater than 5; and A is an organic bridging group.

2. The aqueous emulsion according to claim 1, wherein said blocked polyisocyanate is a blocked polyisocyanate compound.

3. The aqueous emulsion according to claim 1, wherein said blocked polyisocyanate is a blocked urethane prepolymer.

4. The aqueous emulsion according to claim 1, wherein said reactive anionic surface active agent is prepared by reacting a compound of the formula:

R—X—(CH$_2$CH$_2$O)—$_l$H    (I)

wherein R is a C$_{7-26}$ alkyl, alkaryl or alkenyl group; X is —O—, —COO—, —S—, or —NR'— wherein R' is a polyoxyethylene group or a C$_{1-22}$ alkyl group; and l is 0 or an integer from 1 to 200, with a polyisocyanate of the formula:

A—(NCO)$_{m+n}$    (II)

wherein A is an organic bridging group; and m and n each represent an integer from 1 to 4, the sum of m+n being not greater than 5, and then reacting the resultant product with an aqueous solution of sodium bisulfite.

5. The aqueous emulsion according to claim 4, wherein said compound of the formula (I) is a polyethylene glycol mono-higher alkyl ether, a polyethylene glycol mono-alkylaryl ether, a polyethylene glycol mono-higher fatty acid ester, a polyethylene glycol mono-higher alkyl thioether, an ethylene oxide adduct of a higher fatty amine, a higher fatty alcohol, a higher fatty amine or an alkylphenol.

6. The aqueous emulsion according to claim 4, wherein said compound of the formula (II) is hexamethylenediisocyanate, xylylenediisocyanate, tris-(isocyanatohexyl)-biuret or isophoronediisocyanate.

7. The aqueous emulsion according to claim 1, wherein the amount of said reactive anionic surface active agent present in the emulsion ranges from about 3% to about 50% based on the weight of said blocked polyisocyanate component.

8. The aqueous emulsion according to claim 2 or 3, wherein said blocked polyisocyanate is prepared by reacting said polyisocyanate compound or urethane prepolymer with a blocking agent, said blocking agent being a secondary or tertiary alcohol, an active methylene compound, an oxime, a lactam, a phenol or a heterocyclic hydroxyl compound.

9. The aqueous emulsion according to claim 1 further comprising an inert organic solvent.

10. The aqueous emulsion according to claim 9, wherein said inert organic solvent is acetone, methyl ethyl ketone, tetrahydrofuran, dioxane, N,N-dimethylformamide, ethyl acetate or toluene.

11. The aqueous emulsion according to claim 1 further comprising a chain extender.

12. In a method of forming a cured polyurethane film, comprising casting a film using an aqueous emulsion of a polyurethane-forming composition and a chain extender, and heating the cast film at an elevated temerature to dry and cure the film,
the improvement comprising using as said emulsion the aqueous emulsion of claim 11; whereby said heating regenerates isocyanate groups in both the blocked polyisocyanate and the thermally reactive surfactant, which crosslink to form a cured polyurethane film with excellent water resistance.

* * * * *